(12) United States Patent
Graf

(10) Patent No.: US 7,572,372 B2
(45) Date of Patent: Aug. 11, 2009

(54) TANK

(75) Inventor: Otto P. Graf, Teningen (DE)

(73) Assignee: Graf Plastics GmbH, Teningen (DE)

( * ) Notice: Subject to any disclaimer, the term of this patent is extended or adjusted under 35 U.S.C. 154(b) by 0 days.

(21) Appl. No.: 11/896,192

(22) Filed: Aug. 30, 2007

(65) Prior Publication Data
US 2008/0053885 A1 Mar. 6, 2008

(30) Foreign Application Priority Data
Sep. 4, 2006 (EP) .................................. 06018445

(51) Int. Cl.
B01D 21/02 (2006.01)
(52) U.S. Cl. .................... 210/232; 210/521; 210/532.2; 220/4.13; 220/4.24; 220/533; 220/567.1
(58) Field of Classification Search ............ 210/170.08, 210/232, 521, 532.1, 532.2, 538; 220/4.12, 220/4.13, 4.16, 4.21, 4.24, 501, 532, 533, 220/567.1
See application file for complete search history.

(56) References Cited
U.S. PATENT DOCUMENTS

| 3,426,903 | A | * | 2/1969 | Olecko ..................... 210/232 |
| 3,741,393 | A | * | 6/1973 | Estes et al. ............... 210/532.2 |
| 4,325,823 | A | | 4/1982 | Graham |
| 4,517,231 | A | * | 5/1985 | May et al. .................... 220/532 |
| 4,789,487 | A | * | 12/1988 | Wallace .................... 210/532.2 |
| 4,961,670 | A | * | 10/1990 | McKenzie et al. ........ 210/532.2 |
| 5,361,930 | A | * | 11/1994 | Perry ........................ 220/4.12 |
| 5,878,907 | A | * | 3/1999 | Graf ......................... 220/4.24 |
| 6,227,396 | B1 | | 5/2001 | Small |
| 6,280,614 | B1 | | 8/2001 | Berg |
| 6,328,890 | B1 | * | 12/2001 | Thibault .................. 210/532.2 |
| 2004/0129622 | A1 | * | 7/2004 | Pattee ......................... 210/232 |
| 2005/0178721 | A1 | * | 8/2005 | Lombardi, II ............ 210/532.2 |

FOREIGN PATENT DOCUMENTS

| EP | 0 870 877 B1 | 7/2000 |
| EP | 1 533 252 A2 | 5/2005 |
| GB | 2065736 | * 7/1981 |

OTHER PUBLICATIONS

*Kleinkläranlagen und Fäkalien-Sammelgruben* (Minor Sewage Plant and Cesspool/Septic Tank Collection, leaflet K26, edition 2006, Otto Graf GmbH, Junststofferzeugnisse, D-79331 Teningen, pp. 22 and 23.

* cited by examiner

*Primary Examiner*—Christopher Upton
(74) *Attorney, Agent, or Firm*—Baker & Hostetler LLP

(57) ABSTRACT

In a tank B for water treatment, consisting of at least two plastic material tank parts 1, 2 produced by injection moulding or by injection moulding and embossing a separately produced separation wall T is mounted with the edge at the walls of the tank parts such that the mounting regions at least partly are watertight. The separation wall T extends in the tank B crosswise to the joining plane E. The tank parts have opening edge structures R which fit on each other and which are joined in the joining plane E in watertight fashion.

16 Claims, 3 Drawing Sheets

TANK

CROSS-REFERENCE TO RELATED APPLICATIONS

This application claims priority of European Patent Application No. 06018445.4, filed Sep. 4, 2006, the disclosure of which is hereby incorporated by reference in its entirety.

FIELD OF THE INVENTION

The invention relates to a tank for water treatment, consisting of at least two open tank parts made from plastic material by injection moulding or injection moulding and embossing, the tank parts having opening edge structures which fit on each other and which are joined to each other in a joining plain and of at least one separately produced separation wall which extends in the tank crosswise to the joining plane, the separation wall being supported at the edge at walls of the tank parts such that at least some peripheral regions are watertight, wherein the separation wall is made from two, preferably, identical separation wall parts, which are joined to each other in the joining plane.

BACKGROUND OF THE INVENTION

The tank known from EP 0 870 877 B1 is joined from the outer side by clamp-shaped quick connectors from two identical cup-shaped plastic material injection moulded parts having opening edge structures which fit on each other. A sealing is inserted between the opening edge structures. The tank e.g. can be used without a separation wall as a rain water tank. This tank is known under the trade name "Herkules", according to leaflet K26, edition 2006 "Kleinklaranlagen und Fäkalien-Sammelgruben" (Minor Sewage Plant and Cesspool/Septic Tank Collection) of the company Otto Graf GmbH, Kunststofferzeugnisse, D-79331 Teningen, pages 22, 23, and may also be used for collection basins. In this case and provided that several chambers are needed, several of these tanks are installed and are connected via piping for communication.

The leaflet K26, starting on page 4 also discloses minor sewage plants "System Aqua-Simplex" which are based on a cylindrical tank having round end caps. The tank is installed lying horizontally and is monolithically produced by rotation moulding. A separation wall is integrated by rotation moulding in the middle part of the tank. The tank can be used as a single tank sewage plant for treating water in two chambers. The separation wall either separates the chambers totally or allows a communication via an elevated spillover. The leaflet also describes embodiments of the rotation moulded tank in which the separation wall integrated by the rotation moulding process seals at the edge in watertight fashion but has a central throughhole. These embodiments can be used as collection basins or anaerobic digesters. The rotation moulding process is expensive and not very rational, requires large tools and machines, costly material and long cycle times. The separation wall formed by the rotation moulding process is situated in a fixed position. To transport that rotation moulded tank may cause significant transport problems and high transport costs, in particular in the case of a large tank volume. Manipulating the tank in most cases needs the use of a hoisting gear.

In tanks known from U.S. Pat. Nos. 4,325,823 A and 6,280, 614 B which are joined from at least two differently shaped parts separation walls are installed which substantially fill the inner cross-section of the tank and which are anchored at their edges. Manufacturing and mounting each separation wall which is produced with the full or almost full cross-section of the tank is complicated, in particular in the case that a portion of the separation wall mounted in one tank part protrudes into the other tank part.

SUMMARY OF THE INVENTION

It is an object of the invention to provide a plastic material tank for water treatments which can easily be assembled, which is joined from at least two separately produced tank parts, and which can be used in a universal fashion for water treatment in several chambers without the necessity of providing a number of tanks corresponding to the number chambers.

BRIEF DESCRIPTION OF THE DRAWINGS

Embodiments of the invention will be explained with the help of the drawings. In the drawings is.

DESCRIPTION OF THE PREFERRED EMBODIMENTS

Figure 1:
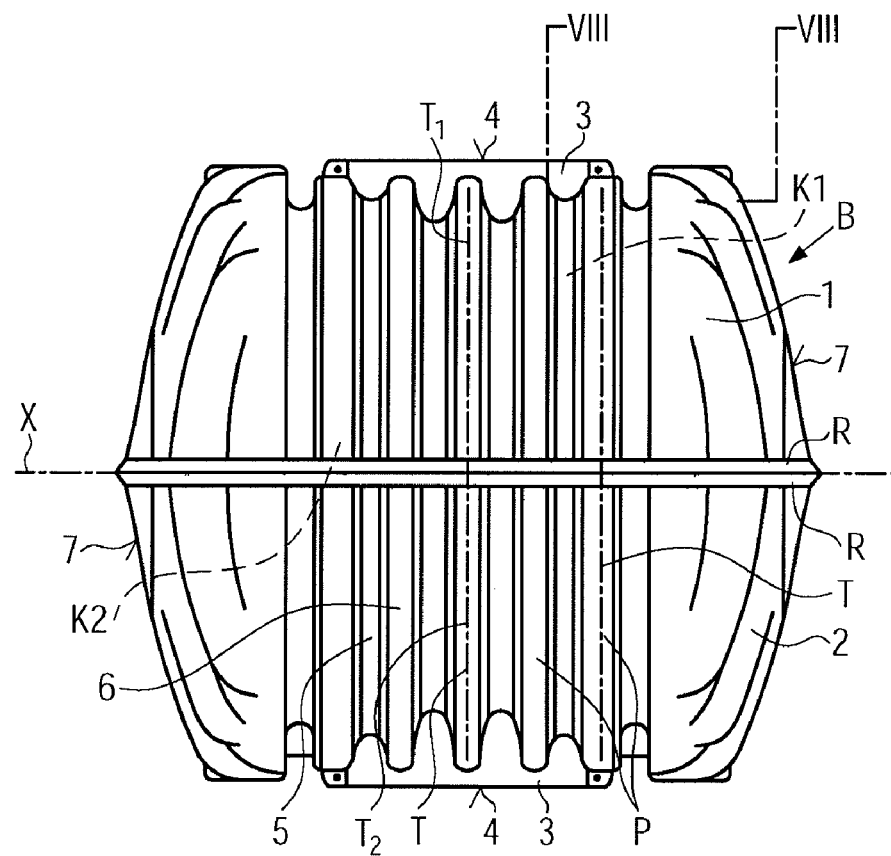
FIG. 1 is a schematic side view of a tank.

Since the tank is joined from tank parts which are produced separately by injection moulding or injection moulding and embossing, and since prior to joining the tank parts upon demand at least one separation wall or several separation walls is or are mounted at a selectable position or at selectable positions, the costs of the tank are lower than in the case of rotation moulding. Furthermore, tank parts can be used which also may be used for producing tanks without a separation wall. For these reasons the same tank parts which stem from a single production tool can be used universally for different types of tanks and application cases (e.g. for using rainwater, for segregation purposes, for sewage purposes for anaerobic digesters, and similar water treatment methods) hence higher piece numbers can be achieved for lower costs. Furthermore, and in the case that the tank first is assembled on site, the transport is facilitated because the tank parts can be stacked in each other. By injection moulding or injection moulding and embossing the tank parts and, expediently, as well the separation wall, allows shorter cycle times and the use of more fair cost material. The processes can be carried out very economically and assure high form precision and good form stability. In other words, based on tank parts and separation walls which are produced in series, in a modular fashion a large variety of different tanks for water treatment can be created. In this case the separation wall is made from two, preferably identical, separation wall parts which are joined in the joining plane. A single tool can be used for producing the separation wall parts. The mounting process is simple as, so to speak, each tank part can be pre-assembled with the respective separation wall part, while the separation wall parts are joined to each other prior to or while joining the tank parts.

In this case it is important that the tank parts are formed with several, preferably identical, separation wall mounting regions, preferably alternating ribs and grooves, respectively defining selectable separation wall positions. These mounting regions of the tank parts also increase the stability when a tank is used without separation walls. In tanks having at least one separation wall a selectable but predetermined and stable mounting position is given for the separation wall at which the separation wall can be inserted upon demand, such that e.g. chambers of equal or different sizes can be created in one and the same tank.

In one embodiment of the tank which is made monolithically from the tank parts by welding the opening edge structures together, expediently, each separation wall part is welded at the edge into one tank part. When welding the opening edge structures also the joining gap between the separation wall parts is welded.

In an alternative embodiment a separable tank is made from the tank parts by joining the opening edge structures with sealings and fixation elements and also by joining the separation gap of the separation wall parts. Also in this case a divided separation wall is inserted. The separation wall is supported by the respectively selected form-fit mounting region of the tank.

In an application case needing a communication between the chambers separated by a separation wall the separation wall or a separation wall part may have at least one communication cut-out located at the edge and/or inside the edge. This cut-out may be pre-shaped or may be cut out first on site.

Expediently, the separation wall parts are produced by injection moulding or injection moulding and embossing from plastic material. Polyethylene or polypropylene or other plastic materials are particularly useful. The plastic material can be provided without reinforcements or may contain a fibre or mineral reinforcement.

In order to achieve sufficient form stability of the separation wall which also has to stiffen the tank, the separation wall expediently has a stiffening waffle structure.

For a simple mounting of the respective separation wall part welding flanges or sealing flanges are provided at the edge and/or at the joint gap.

In a preferred embodiment the tank is made from two identical tank parts, substantially cylindrical and having outwardly rounded end caps. The tank parts are joined in a joining plane containing the cylinder axis. The joining plane, expediently, is situated substantially horizontally when the tank is in use. The ribs and grooves for positioning the eventually mounted separation wall are oriented in the tank parts perpendicularly to the joining plane and are aligned in the joining plane to each other. A round dome boss having a flat covering disc is integrated by moulding into each tank part. The covering disc easily can be removed in the case that a tank dome has to be installed there. The ribs and the grooves, expediently, are interrupted along the covering disc such that the covering disc forms a flat portion of the cylinder. In order to allow the use of only a single type of a separation wall part and to mount this separation wall part at each selectable position, it is expedient when the flat portion in the tank is extended in one embodiment between ribs into several adjacent grooves such that flat separation wall mounting surfaces are defined which have equal lengths. In this case the separation wall substantially is a circular disc having two flat regions in the circumference corresponding to the flat mounting surfaces of the tank parts. The separation wall, for this reason, fits precisely into the cross-section of the tank. In another embodiment the tank is made from two identical, cup-shaped tank parts which are produced in a single tool. The joining plane expediently is situated horizontally when the tank is in use. The ribs and grooves continue over the joining plane and cross the joining plane such that a respective separation wall can be mounted at any selectable position of several positions. However, the same tank consisting of equal tank parts also may be used without a separation wall.

Finally, it is expedient, if a profile is formed along the bottom of at least some grooves, preferably a U-profile, which allows to selectively position a sealing or to weld the separation wall thereto. This profile also extends along at least some of the mounting surfaces, i.e., crosswise over the covering disc of the dome boss.

A tank B for water treatment is, according to FIG. 1, in the shown embodiment joined from two identical tank parts 1, 2. Expediently, the tank parts 1, 2 are injection moulded form parts or form parts which are injection moulded and embossed, expediently from polypropylene or polyethylene which either is reinforced or is without reinforcements.

The tank parts 1, 2 have at there open sides identical opening edge structures R which are joined in a joining plane E. In this case the tank B can be joined according two different joining methods, namely either by welding the opening edge structures R together (FIG. 3), or by setting fixation elements along the opening edge structures and by inserting a sealing (FIG. 4) (joining by clamping).

The opening edge structures R are joined in the joining plane E which e.g. is situated substantially horizontally when the tank is in use. In this embodiment the tank B has a substantially cylindrical shape and outwardly rounded end caps 7 and round dome bosses 3 at the upper and lower sides. The dome bosses 3, at least first, are closed by round and flat cover discs 4. In the shown embodiment the cover discs 4 are situated parallel with respect to the joining plane E which also contains the cylinder axis X. In the substantially cylindrical portion of the tank B alternatingly formed grooves and ribs 5, 6 are provided which extend crosswise to the joining plane, preferably perpendicular to the joining plane E. The grooves and ribs 5, 6 define several separation wall positions P within the cylindrical part each of which can be selected for mounting a separation wall T. More precisely, the selectable positions P are defined by the grooves 6, which are open towards the interior of the tank B. A single separation wall T is mounted in the tank B at a selected position P, which separation wall T is made from two separation wall parts T1, T2. Expediently, the separation wall parts T1, T2 are identical form parts made from plastic material by injection moulding or by injection moulding and embossing.

In the shown embodiment the single separation wall T subdivides the tank B into two chambers K1, K2 of equal size. However, even other subdivisions (not shown) e.g. 1:3, 1:4 can be selected as well.

Figure 2:
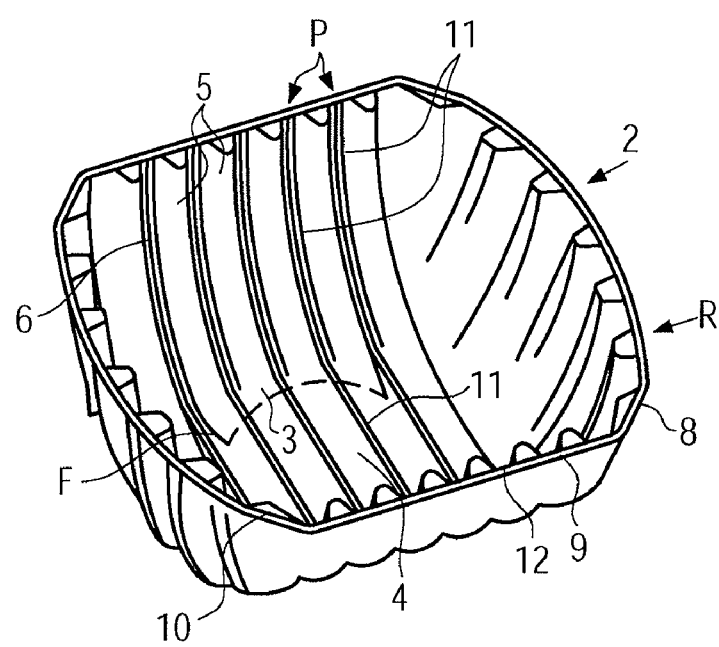
FIG. 2 is a perspective view of one tank part of the tank of FIG. 1.

FIG. 2 shows the lower tank part 2 of the tank B of FIG. 1 (the upper tank part 1 is identical). Alternatively, even differently shaped tank parts could be joined, provided that the respective opening edge structures fit on each other.

Figure 8:
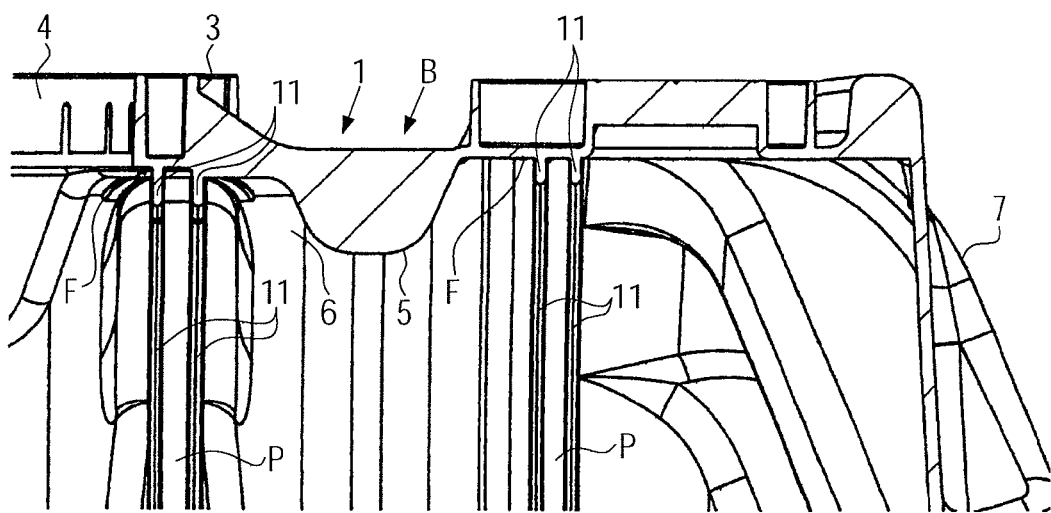
FIG. 8 is a detail section in the section plane VIII-VIII in FIG. 1.

The ribs 5 are formed in FIG. 2 substantially with triangular or trapezoidal cross-section such that in-between the ribs 5 substantially triangular, trapezoidal or rounded grooves 6 are formed which define the several mounting positions P for mounting the at least one separation wall T (or several separation walls). In the region of the round and flat covering disc 4 the ribs 5 are interrupted. Furthermore, the flat covering disc 4 is extended into the grooves 6 such that in these regions and in adjacent grooves mounting surfaces F are formed (FIG. 8) which are of equal length and are flat. At the bottom of each groove 6 a formed profile 11 (FIG. 8) extends from the joining plane E across the covering disc 4 and the mounting surfaces F. Expediently, the profile 11 is a U-profile serving to position a sealing for sealing the edge of the separation wall T, or serving to weld the edge of the separation wall T, T1, T2 with the tank part 2. This profile 11 terminates in the joining plane E at a location 12 and forms, preferably, an extension of an inner fitting surface 10 of the opening edge structure R there. The inner fitting surface 10 is separated by a continuous sealing channel 8 from an outer fitting surface 9. The outer fitting surface 9 may be prolonged by an outer flange which is not shown in detail and which can be used to join the tank parts by means of the fixation elements (FIG. 4).

Figure 3:
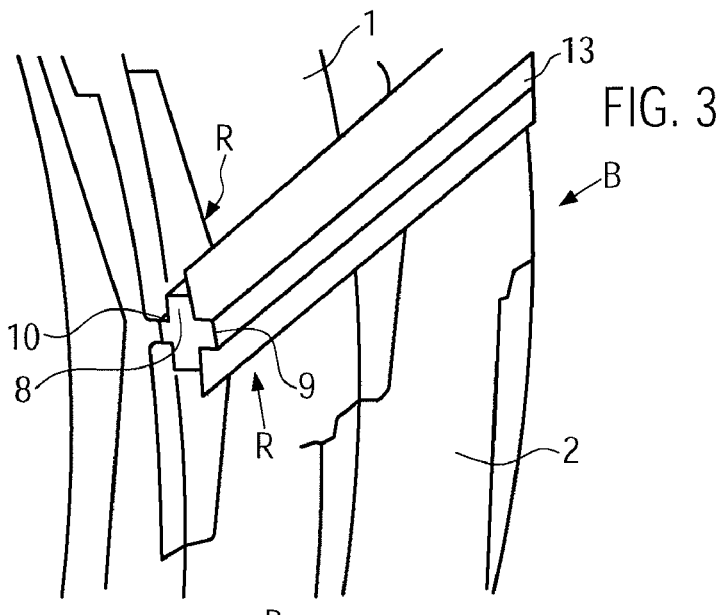
FIG. 3 is a perspective sectional view of the joining region of a monolithic embodiment of the tank of FIG. 1.

FIG. 3 illustrates the tank B which is joined monolithically from the tank parts 1, 2 by welding. In this case the inner and outer fitting surfaces 10, 9 are welded to each other. A sealing is not necessarily provided in the sealing channel 8 because the welding seams are watertight. In this welded version of the tank B the separation wall parts T1, T2, which are not shown in FIG. 3, are respectively welded into the tank parts 1, 2 and are welded to each other in a joining gap as well. Alternatively, the separation wall parts only could be sealed against each other in the joining gap, without being welded together.

Figure 4:
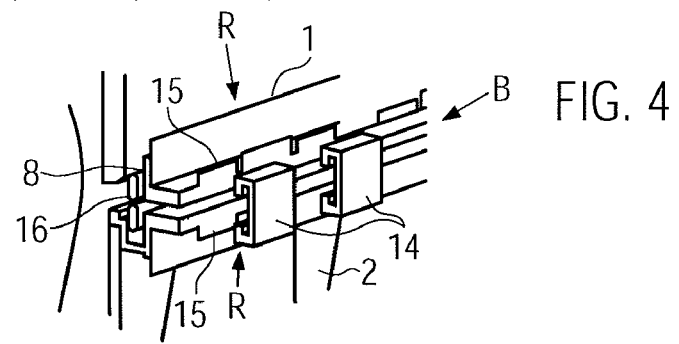
FIG. 4 is a perspective illustration of a joining region of the tank of FIG. 1 which is made separable by use of fixation elements.

Basically, flanges with skewbacks 15 might be formed in the tank parts 1, 2 at the outer side of the outer fitting surface 9 which may serve for joining by clamping according to FIG. 4 by means of C-shaped quick connectors 14. These skewbacks 15 are removed in FIG. 3 together with a part of the outer flange, also together with a welding bead which has been pressed outwardly during the welding process, in order to achieve a flat surface 13 having a nice appearance.

A sealing 16 is inserted into the sealing channel 8 in FIG. 1. The sealing 16 is compressed by the joining pressure and produces the watertightness. In this case the fitting surfaces 10, 9 may contact each other loosely or even may be located with a distance in-between. The opening edge structures R are identical in terms of manufacturing for both versions of the tank B. In case of the version of the tank B in FIG. 4, which is joined by clamping, the separation wall (not shown in FIG. 4) is not welded into the tank parts 1, 2, but is mounted in another fashion, and in particular by using a sealing at the edge of the separation wall and, in some cases, also by using sealing in the joining gap between the separation wall parts T1, T2, as is explained with the help of FIGS. 5 and 6.

Figure 5:
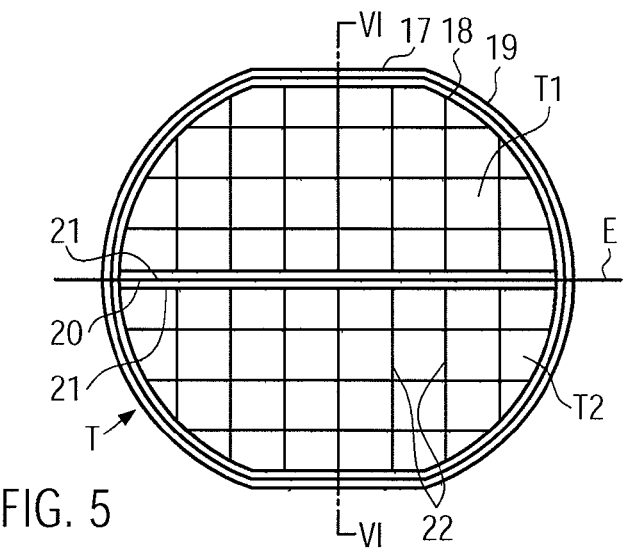
FIG. 5 is a frontal view of a separation wall as can be mounted (alone or several) in the tank of FIG. 1.

FIG. 5 illustrates the separation wall T for mounting at one or at several of the selectable positions P (also in FIG. 8) in the tank B. The separation wall T has the shape of a substantially circular disc with upper and lower flat regions 17 in the circumference corresponding to the covering discs 4 of the dome bosses 3. The separation wall T e.g. has a stiffening waffle structure 22 and a circumferentially extending mounting flange or sealing flange 18, e.g. including a U-profile 19 which is formed at the outer side. The separation wall T expediently is subdivided into two identical separation wall parts T1, T2 which can be jointed with each other in a joining gap 20 by flanges 21. According to FIG. 6 the flanges 21 may be tensioned against each other by fixation elements, e.g. screws 23, with a sealing 25 placed in-between, or by using similar quick connectors in a C shape like the quick connectors 14 which are used at the outer side in FIG. 4. In this case these connectors e.g. may be C-shaped clamps 14 made from metal or plastic material, which grip over the edges of the flanges 21 and which are hooked behind skewbacks which are formed there. In order to achieve a joining tension the skewbacks may be wedge-shaped as are the skewbacks 15.

Figure 6:
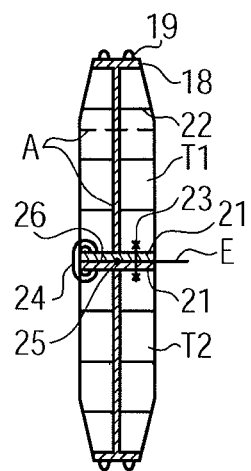
FIG. 6 is a section in the section plane VI-VI in FIG. 5.

In the welded version of the tank B, expediently, the separation wall parts T1, T2 are welded to each other at the flanges 21 in watertight fashion (welding 26 in FIG. 6). The profile 19 of the separation wall parts T1, T2, which may be formed at the outer side in some cases, either can be used for positioning a sealing or for the welding process. A cut-out A of the separation wall T is indicated in dotted lines which is situated at the edge and at an upper side. Alternatively, the cut-out may be situated inside the edge. Expediently, both separation wall parts T1, T2 are joined in the joining plane E, such that they are welded to each other when welding the inner and outer fitting surfaces 9, 10 (FIG. 3) on a flat welding surface and in the same plane as the inner and outer fitting surfaces 9, 10 are welded to each other.

Figure 7:
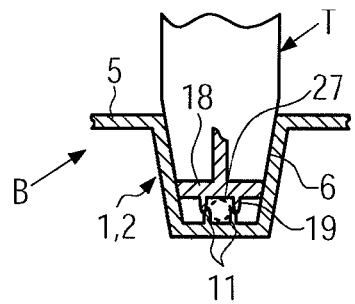
FIG. 7 is a detail section of the joining region of the separation wall in the tank.

The separation wall T in FIG. 7 is inserted with the flange 18 into a groove 6 such that the profiles 11, 19 co-act and either position and compress a sealing 27 or are welded to each other in the region 27 without a sealing in-between.

The separation wall T even may be glued into the tank and could then be sealed by using an extruded gluing bead or sealing bead. For welding along the edge of the separation wall T, and also in the joining gap, a wire substrate could be imbedded into plastic material which then serves as a resistance element when being supplied with current to generate the necessary temperature for softening and welding the plastic material. In the case of the version of the tank B which is joined by the quick connectors (FIG. 4) the joining pressures of the quick connectors 14 also positions the separation wall T or the separation wall parts T1, T2 within the tank B.

If desired, the tank parts 1, 2 as well could be used producing a tank without a separation wall. Also in this case, the tank parts 1, 2 could be joined either according to FIG. 3 or according to FIG. 4. The tank B without a separation wall e.g. could be used as a rainwater tank for using rainwater, while the tank B having one or several separation walls T can be used for other water treatment processes, e.g. like a minor sewage plant, a cesspool/septic tank, anaerobic digester, or the like. The then needed connections for piping could be made by cut-out in the walls of the tank parts. Additional accessories and additional assemblies then could be mounted by using the dome boss, into which, e.g. at the upper sides in the usage position of the tank, a tank dome is inserted later.

Figure 9:
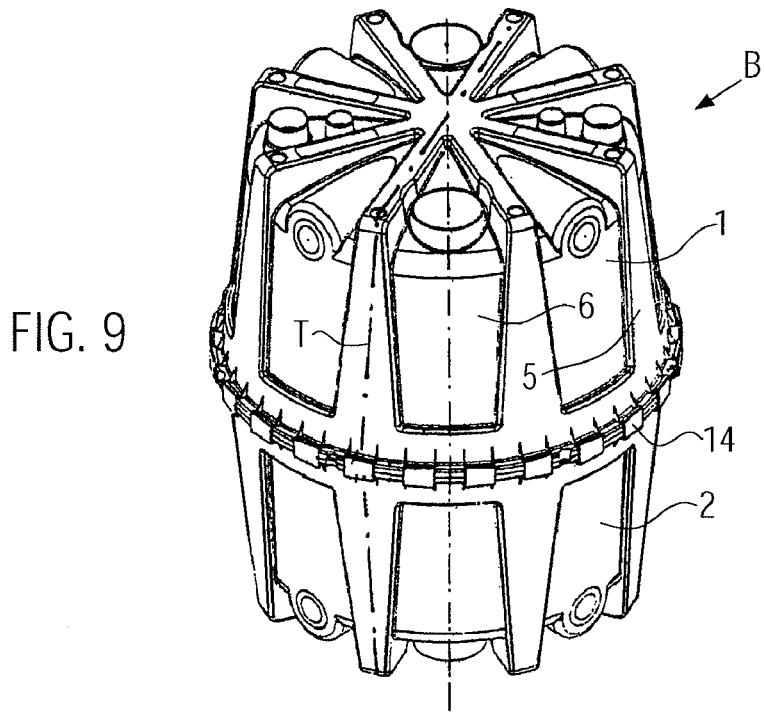
FIG. 9 is a perspective view of another embodiment of a tank.

FIG. 9 illustrates another embodiment of the tank B which in this case is joined from, preferably identical, cup-shaped tank parts 1, 2, and, in particular, by using quick connectors 14 and a not shown sealing. The tank B may be used without a separation wall, but, preferably, contains at least one separation wall T which selectively can be mounted in the mounting positions P as defined by the grooves 5. The separation wall T can be mounted as has been explained for the preceding figures. The cup-shaped tank parts 1, 2 even could be welded to each other without inserting a sealing.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A tank for water treatment, comprising: at least two open tank parts made from plastic material by injection moulding or injection moulding and embossing, the tank parts having opening edge structures which fit on each other and which are joined to each other in a joining plain and of at least one separately produced separation wall which extends in the tank crosswise to the joining plane, the separation wall being supported at the edge at walls of the tank parts such that at least some peripheral regions are watertight, wherein the separation wall is made from two separation wall parts, which are joined to each other in the joining plane.

2. A tank according to claim 1, wherein the tank parts are formed with several separation wall mounting regions, comprising alternating ribs and grooves defining equal separation wall mounting positions.

3. A tank according to claim 2, wherein the separation wall parts are identical.

4. A tank according to claim 1, wherein separation wall mounting regions are situated in the walls of the tank parts in a direction along the joining plane perpendicular to the joining plane.

5. A tank according to claim 1, wherein each separation wall part is welded at the edge into one tank part and that the opening edge structures of the tank parts and a separation gap between the separation wall parts respectively are joined by welding.

6. A tank according to claim 1, wherein each separation wall part is inserted with at least one sealing at the edge into a tank part, and that opening edge structures of the tank parts and a separation gap between the separation wall parts are joined with sealing and fixation elements.

7. A tank according to claim 1, wherein the separation wall or one separation wall part is provided with at least one communication cut-out, which is situated at the edge and/or inside the edge, respectively.

8. A tank according to claim 1, wherein the separation wall or the separation wall parts are produced either from reinforcement-free plastic material or from fiber reinforced or mineral reinforced plastic material by injection molding or injection molding and embossing.

9. A tank according to claim 8, wherein the parts are produced from one of PE and PP.

10. A tank according to claim 1, wherein the separation wall is provided with a stiffening waffle structure.

11. A tank according to claim 1, wherein a welding flange or sealing flange is provided along the edge of the separation wall or the separation wall part and of the separation wall parts, also along the joining gap.

12. A tank according to claim 1, wherein the tank is formed substantially cylindrical from two identical tank parts having outwardly rounded end caps by joining the tank parts in a joining plane containing the cylinder axis, the joining plane, being substantially horizontal in the usage position of the tank, that the ribs and grooves are oriented in the tank parts perpendicular to the joining plane and continue in one another over the joining plane, and that a round dome boss having a flat covering disc is formed into each tank part substantially radially to the cylinder axis, which covering disc forms a flat portion of the cylinder, and such that the ribs and grooves are interrupted along the covering disc.

13. A tank according to claim 12, wherein the flat portion is prolonged between ribs into several adjacent grooves for defining separation wall mounting surfaces which are flat and have equal length, and that the respective separation wall is substantially a circular disc having two flat regions in the circumference corresponding with the flat mounting surfaces.

14. A tank according to claim 13, wherein along the bottom of at least several grooves and along at least several mounting surfaces a respective profile, preferably a U-profile, is formed for selectively positioning either a sealing or for welding the separation wall.

15. A tank according to claim 1, wherein the tank is made from two identical cup-shaped tank parts, which are joined in a joining plane which is situated substantially horizontally in the usage position of the tank, with ribs and grooves being continued into each other in the joining plane crosswise to the joining plane, and that a separation wall is mounted in at least one of the grooves.

16. A tank according to claim 1, wherein the separation wall parts are identical.

* * * * *